(12) United States Patent
Lee

(10) Patent No.: US 8,363,138 B2
(45) Date of Patent: Jan. 29, 2013

(54) DIGITAL PHOTOGRAPHING APPARATUS

(75) Inventor: Myung-hun Lee, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 12/221,614

(22) Filed: Aug. 5, 2008

(65) Prior Publication Data
US 2009/0109300 A1    Apr. 30, 2009

(30) Foreign Application Priority Data

Oct. 31, 2007 (KR) .................. 10-2007-0110249

(51) Int. Cl.
- H04N 3/14 (2006.01)
- H04N 9/04 (2006.01)
- H04N 5/228 (2006.01)

(52) U.S. Cl. ............... 348/305; 348/283; 348/222.1

(58) Field of Classification Search .......... 348/222.1, 348/333.01, 333.11, 321, 231.6, 294, 302–305
See application file for complete search history.

(56) References Cited

U.S. PATENT DOCUMENTS

| | | | |
|---|---|---|---|
| 5,523,788 A * | 6/1996 | Kannegundla et al. | 348/321 |
| 2001/0019362 A1* | 9/2001 | Nakamura et al. | 348/222 |
| 2003/0117513 A1* | 6/2003 | Anderson | 348/333.11 |
| 2004/0090540 A2* | 5/2004 | Tay | 348/231.99 |
| 2005/0088535 A1* | 4/2005 | Hatano | 348/220.1 |

FOREIGN PATENT DOCUMENTS

| | | |
|---|---|---|
| CN | 1612594 A | 5/2005 |
| JP | 2001-238106 A | 8/2001 |

OTHER PUBLICATIONS

Office Action established for CN 200810212488.9 (Jul. 23, 2012).

* cited by examiner

Primary Examiner — Aung S Moe
Assistant Examiner — Mekonnen Dagnew
(74) Attorney, Agent, or Firm — Drinker Biddle & Reath LLP

(57) ABSTRACT

A digital photographing apparatus capable of performing high-speed continuous shooting and immediately storing data regarding a captured image. The digital photographing apparatus includes an image capture device for generating first data regarding an image generated from light input in response to a signal input by a user, a first data reading unit for reading the first data in units of a plurality of interlaced groups, a data conversion unit for converting the read data into second data, and a display unit for displaying an image generated from light incident on the image capture device. The data conversion unit starts conversion of the read data into the second data when the first data reading unit reads a last group of the first data.

24 Claims, 9 Drawing Sheets

US 8,363,138 B2

DIGITAL PHOTOGRAPHING APPARATUS

CROSS-REFERENCE TO RELATED PATENT APPLICATIONS

This application claims the benefit of Korean Patent Application No. 10-2007-0110249, filed on Oct. 31, 2007, in the Korean Intellectual Property Office, the entire content of which is incorporated herein by reference.

BACKGROUND OF THE INVENTION

1. Field of the Invention

The present invention relates to a digital photographing apparatus, and more particularly, to a digital photographing apparatus capable of performing high-speed continuous shooting and immediately storing data regarding a captured image.

2. Description of the Related Art

In general, a digital photographing apparatus displays on a display unit a live view image that is a real-time moving image generated from light incident on an image capture device. Thus, a user can see a subject to be photographed and then photograph the subject while viewing the displayed image. After the photographing, a live view image generated from light incident on the image capture device needs to be displayed on the display unit for further photographing.

FIG. 1 is a timing diagram illustrating a data processing process of a conventional digital photographing apparatus. In detail, FIG. 1 is a timing diagram illustrating a process between displaying a live view image on a display unit for a first photographing operation and displaying another live view image on the display unit for a third photographing operation.

Referring to FIG. 1, the conventional digital photographing apparatus displays a live view image on a display unit in order to perform the first photographing operation after a time t1 (LV). Next, auto-focusing starts from a time t2 in response to a first signal S1 received from a user (AF), and then first data regarding an image generated from light incident on an image capture device is read starting from a time t3 in response to a second signal S2 input by the user or automatically (CAP). After reading the first data, the first data is converted into second data starting from a time t4 (BY). From a time t5, third data corresponding to a low-definition image of an image corresponding to the second data is generated from the second data (RS). Also, if necessary, fourth data corresponding to a further lower definition image of the image corresponding to the second data may be generated (RT) or the second data may be compressed (ENC). After completing data processing, the data regarding the image is recorded on a storage medium (WR).

As further shown, a live view image is displayed on the display unit in order to perform a second photographing operation after completing the first photographing operation (LV'). In the case of a conventional digital photographing apparatus, as illustrated in FIG. 1, a live view image is displayed on the display unit in order to perform the second photographing operation at a time t6, that is, the moment generation of the third data corresponding to the low-definition image of the image corresponding to the second data (RS), which is included in a data processing process of the first photographing operation, is completed (LV'). Then auto-focusing starts from a time t7 in response to a signal S1' input by the user (AF'), and first data regarding an image generated from light incident on the image capture device is read starting from a time t8 in response to a signal S2' input by the user or automatically (CAP'). Next, the first data is converted into second data (BY'). Next, third data corresponding to a low-definition image of an image corresponding to the second data is generated (RS'). Next, fourth data corresponding to a further lower definition image of the image that corresponds to the second data is generated (RT'), and the second data is compressed (ENC'). Thereafter, the data regarding the image is recorded on the storage medium (WR').

After performing the second photographing operation, a live view image is displayed on the display unit in order to perform the third photographing operation (LV"). In the case of the conventional digital photographing apparatus, as illustrated in FIG. 1, a live view image is displayed on the display unit in order to perform the third photographing operation at a time t9, that is, the moment that generation of the third data corresponding to the image corresponding to the second data (RS'), which is included in a data processing process of the second photographing operation, is completed (LV").

Such a conventional digital photographing apparatus is not capable of performing the second photographing operation between the time t3 when the user begins the first photographing operation and the time t6 when the live view image is displayed on the display unit in order to perform the second photographing operation, for the following reason.

A plurality of photoelectric conversion devices are arranged on the image capture device, and each of the photoelectric conversion devices generates data corresponding to red, green or blue light when the first photographing operation begins in response to a signal input by the user. Thus, first data is obtained. A data conversion unit converts the first data (representing a captured image) generated by the image capture device into second data (representing the captured image), such as YCbCr data, before storing the first data in a storage medium. In order to display a live view image, which is a real-time moving image for performing the second photographing operation, on the display unit, the data conversion unit converts first data (for a live view image) generated from light incident on the image capture device into second data (for the live view image), such as YCbCr data, and then displays the live view image on the display unit. For the second photographing operation, the data conversion unit is needed not only to process the data for the live view image but also to process the data regarding the image captured prior to the processing of the data for the live view image. Thus the live view image cannot be displayed on the display unit until the data conversion unit completes converting the first data representing the captured image into the second data. For this reason, as illustrated in FIG. 1, when the conventional digital photographing apparatus is used, it is impossible to perform the second photographing operation after performing the first photographing operation between the time t3 and the time t6, and the interval between the time t3 and the time t6 is large.

SUMMARY OF THE INVENTION

The present invention provides a digital photographing apparatus capable of performing high-speed continuous shooting and immediately storing data regarding a captured image.

Accordingly, an embodiment of the present invention provides a digital photographing apparatus comprising an image capture device for generating first data regarding an image generated from light input in response to a signal input by a user; a first data reading unit for reading the first data in units of a plurality of interlaced groups; a data conversion unit for converting the read data into second data; and a display unit for displaying an image generated from light incident on the image capture device. The data conversion unit starts conversion of the read data into the second data when the first data reading unit reads a last group of the first data.

The data conversion unit may start conversion of the read data into the second data after the first data reading unit starts reading of the last group of the first data before the first data reading unit completes the conversion of the read data into the second data. Also, the data conversion unit may start conversion of the read data into the second data after the first data reading unit starts reading of the last group of the first data, and the conversion of the read data and the reading of the first data by the first data reading unit may be simultaneously performed before the reading of the last group of the first data ends. The displaying of a live view image generated from light incident on the image capture device may start after the conversion of the read data.

The apparatus may further include a storage medium that is attachable to or detachable from the apparatus, or is fixedly built in the apparatus. The second data or data obtained by post-processing the second data can be stored in the storage medium while displaying the live view image on the display unit.

The storing of the second data or the data obtained by post-processing the second data and the displaying of the live view image may be simultaneously performed until the storing of the second data or the data obtained by post-processing the second data in the storage medium ends. Also, the storing of the second data or the data obtained by post-processing the second data and the displaying of the live view image may be simultaneously performed until the displaying of the live view image ends.

The apparatus may further include an encoder compressing the second data received from the data conversion unit, wherein the encoder compresses the second data while the live view image is displayed on the display unit. The compression of the second data using the encoder and the displaying of the live view image may be simultaneously performed until the encoder completes the compression of the second data. The compression of the second data and the displaying of the live view image may be simultaneously performed until the displaying of the live view image ends.

The apparatus may further include a storage medium that is attachable to or detachable from the apparatus, or is fixedly built in the apparatus, wherein the result of compressing the second data using the encoder can be stored in the storage medium while displaying the live view image on the display unit. The storing of the result of compressing the second data and the displaying of the live view image may be simultaneously performed until the storing of the result of compressing the second data is completed. Also, the storing of the result of compressing the second data and the displaying of the live view image may be simultaneously performed until the displaying of the live view image ends.

The apparatus may further include a resizing unit generating third data, which corresponds to a low-definition image of an image corresponding to the second data, from the second data. The resizing unit generating the third data from the second data after the data conversion of the data conversion unit.

Displaying of a live view image generated from light incident on the image capture device on the display unit may start after the data conversion of the data conversion unit, where the displaying of the live view image and the generation of the third data using the resizing unit start simultaneously. The displaying of the live view image and the generation of the third data may be simultaneously performed until the generation of the third data ends.

The apparatus may further include a storage medium that is attachable to or detachable from the apparatus, or is fixedly built in the apparatus. The third data, and either the second data or the data obtained by post-processing the second data, are stored in the storage medium while displaying the live view image on the display unit after the generation of the third data. The storing of the third data, and either the second data or the data obtained by post-processing the second data, and the displaying of the live view image, may be simultaneously performed until the storing of the third data, and either the second data or the data obtained by post-processing the second data ends. Also, the storing of the third data, and either the second data or the data obtained by post-processing the second data, and the displaying of the live view image may be simultaneously performed until the displaying of the live view image ends.

The apparatus may further include an encoder for compressing the second data received from the data conversion unit, wherein the encoder compresses the second data while the live view image is displayed on the display unit. The compression of the second data and the displaying of the live view image may be simultaneously performed until the encoder completes the compression of the second data. Also, the compression of the second data and the displaying of the live view image may be simultaneously performed until the displaying of the live view image ends.

The apparatus may further include a storage medium that is attachable to or detachable from the apparatus, or is fixedly built in the apparatus. The third data and the result of compressing the second data can be stored in the storage medium while displaying the live view image on the display unit. The displaying of the live view image and the generation of the third data may be simultaneously performed until the displaying of the live view image ends.

As described above, a digital photographing apparatus according to the present invention is capable of performing high-speed continuous shooting and immediately storing data of a captured image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described more fully with reference to the accompanying drawings.

Figure 2:
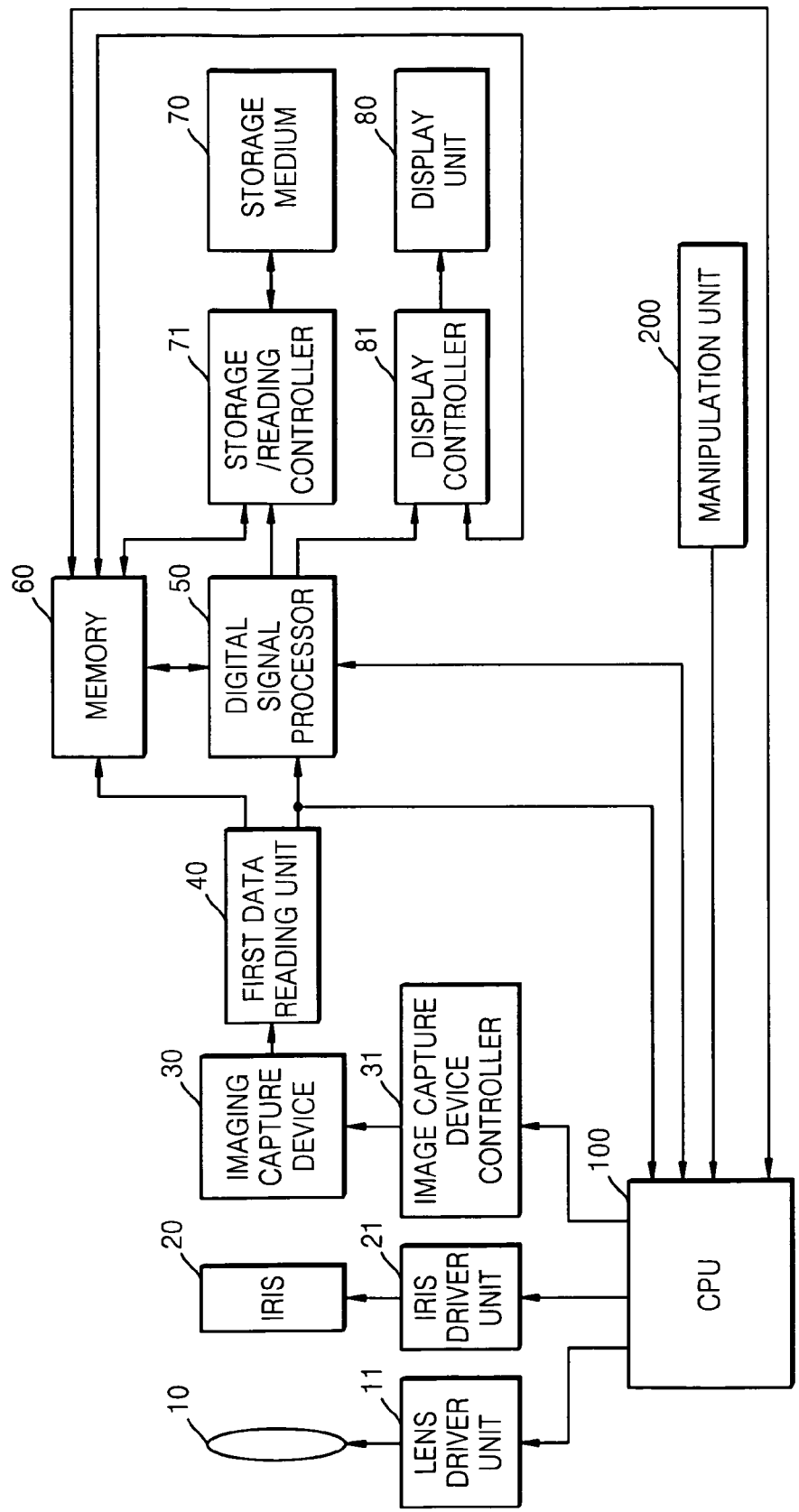
FIG. 2 is a block diagram schematically illustrating a digital photographing apparatus according to an embodiment of the present invention.

FIG. 2 is a block diagram schematically illustrating a digital photographing apparatus according to an embodiment of the present invention. In this embodiment, all operations of the digital photographing apparatus can be controlled by a central processing unit (CPU) 100. The digital photographing apparatus includes a manipulation unit 200 having a key generating an electrical signal in response to a user's instruction. An electrical signal generated by the manipulation unit 200 is transferred to the CPU 100 so that the CPU 100 can control the digital photographing apparatus in response to the electrical signal.

In a shooting mode, if an electrical signal generated in response to a user's instructions is input to the CPU 100, the CPU 100 analyzes the electrical signal and controls a lens driving unit 11, an iris driving unit 21, and an image capture device controller 31, thus controlling the location of a lens 10, the degree of openness of an iris 20, and the sensitivity of an image capture device 30. The image capture device 30 generates first data regarding an image from received light, and the first data is read by a first data reading unit 40. For example, the first data reading unit 40 may be an analog-to-digital converter (ADC) or include an ADC. The first data read by the first data reading unit 40 can be input directly to a digital signal processor 50 or via a memory 60. If necessary, the first data can be input to the CPU 100. The memory 60 can be a storage medium, such as a read only memory (ROM) or a random access memory (RAM). The digital signal processor 50 can perform digital signal processing, such as gamma correction or white balance correction, if needed. The digital signal processor 50 includes a data conversion unit (not shown). However, the data conversion unit can be mounted separately from the digital signal processor 50. Hereinafter, for convenience of explanation, it is assumed that the data conversion unit is included in the digital signal processor 50. The operation of the data conversion unit will later be described.

Image data output from the digital signal processor 50 or the data conversion unit is provided to a display controller 81 directly or via the memory 60. The display controller 81 controls a display unit 80 in order to display the image on the display unit 80. The image data output from the digital signal processor 50 or the data conversion unit is input to a storing/reading controller 71 via the memory 60 or directly. The storing/reading controller 71 stores the image data in a storage medium 70 in response to a signal from the user or automatically. Alternatively, the storing/reading controller 71 interprets image data from an image file stored in the storage medium 70, and provides the result of interpretation to the display controller 81 via the memory 60 or using another path so that the image can be displayed on the display unit 80. The storage medium 70 can be easily attached to and detached from the digital photographing apparatus or be fixedly built into the digital photographing apparatus.

In the case of the above digital photographing apparatus according to the this embodiment, either data regarding a still image generated from light incident on the image capture device 30 is stored in the memory 60 or the storage medium 70 or the still image is displayed on the display unit 80 in response to a signal received from the user. Also, in the above digital photographing apparatus, a live view image, which is a real-time moving image generated from light incident on the image capture device 30, can be displayed on the display unit 80 in response to a signal input by a user or automatically, so that the user can determine an image that is to be captured while viewing the image displayed on the image display unit 80.

Figure 3:
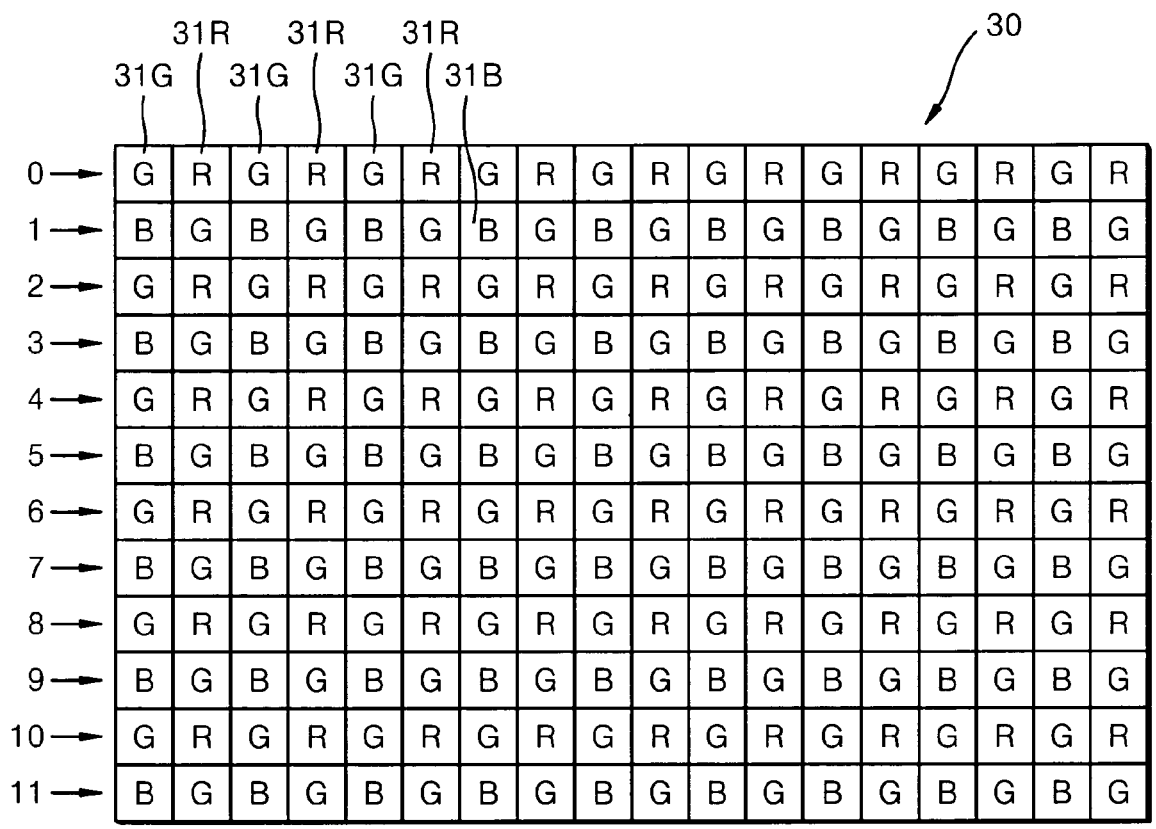
FIG. 3 is a conceptual diagram of an example of an image capture device illustrated in FIG. 2.

FIG. 3 is a conceptual diagram schematically illustrating the image capture device 30 illustrated in FIG. 2. Referring to FIG. 3, the image capture device 30 includes red, green and blue photoelectric conversion devices 31G, 31R, and 31B. Each of the red, green and blue photoelectric conversion devices 31G, 31R, and 31B generates first data, that is, an electrical signal, according to the intensity of light incident thereon. Thus, first data is obtained. For example, the red photoelectric conversion devices 31R generate an electrical signal according to the intensity of red light, the green photoelectric conversion devices 31G generate an electrical signal according to the intensity of green light, and the blue photoelectric conversion devices 31B generate an electrical signal according to the intensity of blue light. Although FIG. 3 illustrates that the red photoelectric conversion devices 31R, the green photoelectric conversion devices 31G, and the blue photoelectric conversion devices 31B are arranged in the image capture device 30, photoelectric conversion devices corresponding to other colors may be also arranged in the image capture device 30. Also, the arrangement of the photoelectric conversion devices 31R, 31G and 31B is not limited to the illustration of FIG. 3. The arrangement pattern of the photoelectric conversion devices as illustrated in FIG. 3 or a modification thereto is referred to as a bayer pattern. Referring to FIG. 3, the total number of the green photoelectric conversion devices 31G is greater than the total number of the other photoelectric conversion devices 31R and 31B, in order that more data regarding green light can be precisely obtained since the human being's eyes is less sensitive to green than to the other colors. However, the present invention is not limited to the above description.

If the image capture device 30 generates first data, the first data reading unit 40 (see FIG. 2) reads the first data generated by the image capture device 30 in units of a plurality of interlaced groups. For example, if the first data generated by the image capture device 30 as illustrated in FIG. 3 is divided into three interlaced groups, data of a 0th row, a third row, a sixth row, and a ninth row may be categorized as a first group of data; a first row, a fourth row, a seventh row and a tenth row of data may be categorized as a second group of data; and data of a second row, a fifth row, an eighth row and an eleventh row may be a third group of data. In this case, the first data reading unit 40 does not sequentially read from the $0^{th}$ row to the eleventh row of the first data generated by the respective photoelectric conversion devices but sequentially reads the first group of the first data, the second group of the first data, and then the third group of the first data. That is, the first data reading unit 40 sequentially reads the 0th row, the third row, the sixth row, the ninth row, the first row, the fourth row, the seventh row, the tenth row, the second row, the fifth row, the eighth row and the eleventh row of the first data. However, the total number of groups of data and the sequence of reading the data are not limited to the above description.

As described above, for example, the first data reading unit 40 may be an analog-to-digital conversion unit or include an analog-to-digital conversion unit. In this case, the first data generated by the image capture device 30 or the data read by the first data reading unit 40 may be referred to as raw data or bayer data.

The data conversion unit of the digital signal processor 50 converts the read data into second data. The data conversion may be performed various ways. For example, the data conversion may include first conversion of converting the read data into color data and second conversion of converting the color data into second data, i.e., YCbCr data.

The first conversion may be performed in various ways. For example, during the first conversion, the read data can be converted into color data, based on data obtained by each of the blue photoelectric conversion devices 31B of the image capture device 30 illustrated in FIG. 3. In general, since each pixel on the display unit has a red sub pixel, a blue sub pixel, and a green sub pixel, read data needs to be converted into data each corresponding to one of sub pixels of each pixel in order to display an image on the display unit. Conversion of the read data into color data is not limited to conversion into red data, blue data and green data, that is, the read data can be converted into data related to other colors. However, for convenience of explanation, it is assumed that conversion of read data into color data means conversion into red data, blue data and green data.

Figure 4:
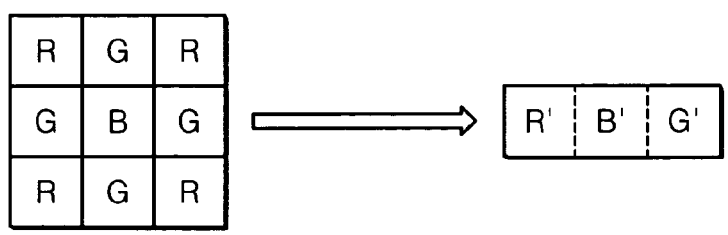
FIG. 4 is a conceptual diagram schematically illustrating an example of a first conversion.

FIG. 4 is a conceptual diagram schematically illustrating an example of the first conversion according to an embodiment of the present invention. As illustrated in FIG. 4, data generated by and read from the blue photoelectric conversion device 31B of FIG. 3 and neighboring photoelectric conversion devices can be represented as data B related to blue, data R related to red, and data G related to green. In this case, blue data B', red data R' and green data G' contained in one pixel can be obtained by representing the data read from the blue photoelectric conversion device 31B as blue data B', the average value (or the value obtained by post-processing the average value) of data read from the neighboring four red photoelectric conversion devices 31R as red data R', and the average value (or the value obtained by post-processing the average value) of data read from the neighboring four green photoelectric conversion devices 31G as green data G'. However, such conversion is just illustrative and thus the present invention is not limited to this type of conversion.

The second conversion may also be performed in various ways. For example, in the second conversion, RGB color data may be converted into YCbCr data. R', B' and G' color data illustrated in FIG. 4 may be converted into YCbCr data, as follows:

$$Y=0.29900R'+0.58700G'+0.11400B'$$

$$Cb=-0.16874R'-0.33126G'+0.50000B'$$

$$Cr=0.50000R'-0.41869G'-0.08131B' \quad (1),$$

wherein Y denotes the brightness of one pixel containing a red sub pixel, a blue sub pixel, and a green sub pixel, Cb denotes information regarding the brightness of the blue sub pixel, and Cr denotes information regarding the brightness of the red sub pixel. However, Cb and Cr do not directly represent the brightness of the blue sub pixel and the brightness of the red sub pixel, respectively. Data regarding the brightness of the red sub pixel, the green sub pixel, and the blue sub pixel can be obtained using the following equation:

$$R'=1.00000Y+1.40200Cr$$

$$G'=1.00000Y-0.34414Cb-0.71414Cr$$

$$B'=1.00000Y+1.77200Cb \quad (2)$$

Digital photographing apparatuses support various data storing formats so that a user can select a desired data storing format from among them. In general, in a digital photographing apparatus, if a raw data storing format is selected, data is stored in the format of the second data, such as YCbCr data, which is the result of conversion using the data conversion unit, rather than in the format of the first data or the read data. However, the second data is not limited to YCbCr data, and may be data having another format, such as YUV data.

Figure 1:
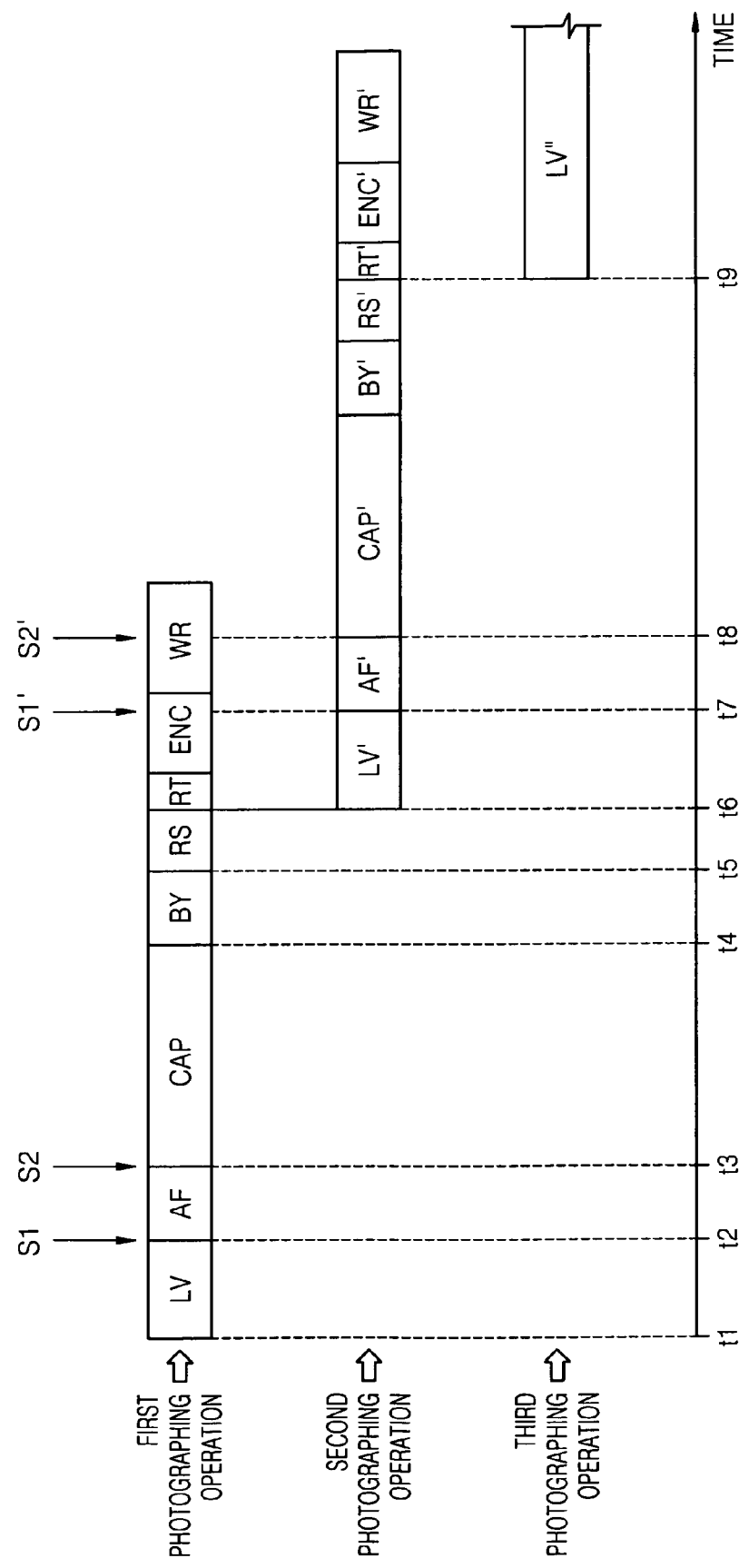
FIG. 1 is a timing diagram of a data processing process an example of a conventional digital photographing apparatus.

As described above with reference to FIG. 1, a conventional digital photographing apparatus reads first data regarding an image generated from light incident on an image capture device starting from the time t3 (CAP), a data conversion unit converts the read first data into second data starting from the time t4 after reading of the first data (BY), and then a live view image is displayed on a display unit in order to start performing a second photographing operation from the time t6 after converting the first data into the second data or after generating third data corresponding to a low-definition image of an image corresponding to the second data (RS). Accordingly, when using the conventional digital photographing apparatus, the second photographing operation cannot be performed right after performing the first photographing operation between the time t3 and the time t6, that is, an interval between the time t3 and the time t6 is great as illustrated in FIG. 1. However, in the case of a digital photographing apparatus according to this embodiment of the present invention, when a first data reading unit reads data of a last group, a data conversion unit begins converting the read data into second data, thereby preventing such a problem, which will now be described in greater detail with reference to FIG. 5.

Figure 5:
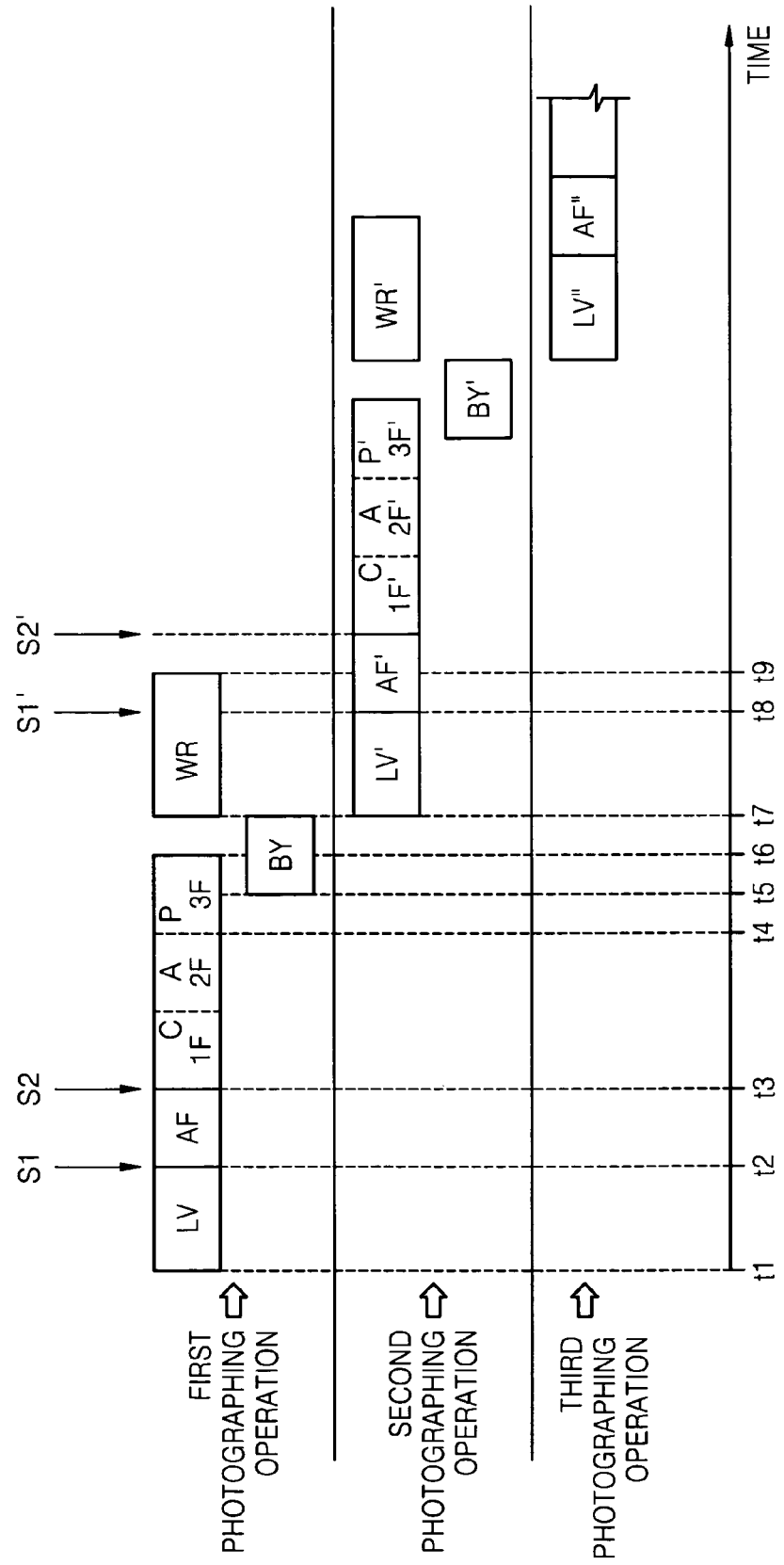
FIG. 5 is a timing diagram illustrating an example of a data processing process of the digital photographing apparatus illustrated in FIG. 2 according to an embodiment of the present invention.

FIG. 5 is an example of a timing diagram illustrating a data processing process of a digital photographing apparatus according to an embodiment of the present invention. In detail, FIG. 5 is a timing diagram illustrating a process from displaying one live view image on a display unit for a first photographing operation to displaying another live view image on the display unit for a third photographing operation.

Referring to FIG. 5, the digital photographing apparatus displays one live view image on a display unit in order to perform a first photographing operation after a time t1 (LV). Next, auto-focusing starts from a time t2 (AF) in response to a signal received from a user, and then first data regarding an image generated from light incident on an image capture device is read starting from a time t3 in response to a signal S2 received from the user or automatically (CAP). However, a standby time in which the signal S2 is received from the user may be needed prior to reading of the first data (CAP) after performing auto-focusing (AF).

When reading the first data (CAP), a conventional digital photographing apparatus converts first data into second data after reading of the first data is completed (BY) as described above with reference to FIG. 1. However, in the case of a digital photographing apparatus according to the present embodiment, conversion of read data into second data starts when a first data reading unit reads data of a last group (3F) as illustrated in FIG. 5.

That is, as described above with reference to FIG. 3, if the first data is read in units of three interlaced groups, a data conversion unit starts converting the read data into second data after a time t4 when the first data reading unit starts reading the third group, i.e., the last group, of the first data and before a time t6 when the first data reading unit completes reading the third group of the first data. FIG. 5 illustrates that the data conversion unit begins conversion of the read data into the second data at a time t5. Thus the data conversion unit begins conversion of the read data into the second data at the time t5 after the time t4 when the first data reading unit starts reading the last group of the first data. The digital photographing apparatus according to the present embodiment allows the data conversion of the data conversion unit (BY) and the data reading of the first data reading unit (3F) to be simultaneously performed until the time t6 when the first data reading unit completes reading the last group of the first data. After completing the data conversion of the data conversion unit (BY) at a time t7, displaying of a live view image generated from light incident on an image capture device on a display unit starts thus creating the conditions allowing the second photographing operation to be performed (LV').

One reason why the data conversion unit starts conversion of the read data into the second data after the time t4 when the first data reading unit starts reading the last group of the first data is to obtain color data from first data at adjacent rows as described above with reference to FIG. 4. That is, if the third group (last group) of the first data generated by the image capture device 30 of FIG. 3 has yet to be read, the second row, the fifth row, the eighth row and the eleventh row of the first data, which belong to the third group of the first data, are not read and thus color data cannot be obtained from already read first data. Thus after the first data reading unit begins reading the third group (last group) of the first data at the time t4, the data conversion unit starts conversion of the read data into second data.

As described above, in the case of the digital photographing apparatus according to this embodiment, when the first data reading unit starts reading a last group of first data, the data conversion unit starts converting the read data into second data. As a result, the interval between the time t3 when the first data reading unit starts reading the first data and the time t7 when the data conversion unit completes conversion of the first data, is much shorter than the interval between a time when reading of first data begins and a time when conversion of the first data into second data begins in a conventional digital photographing apparatus in which a first data reading unit completes reading the first data and then a data conversion unit converts the first data into the second data. Thus the interval between when the first photographing operation starts in response to the signal S2 and when a live view image starts to be displayed for the second photographing operation from the time t7 in the case of the digital photographing apparatus according to the present embodiment, is greatly shorter than the interval between when the first photographing operation starts in response to a signal S2 and when a live view image starts to be displayed for the second photographing operation from the time t5 or t6 (see FIG. 1) in the case of a conventional digital photographing apparatus as illustrated in FIG. 1. Accordingly, high-speed continuous shooting can be improved when using the digital photographing apparatus according to the present embodiment more than when using a conventional digital photographing apparatus.

As apparent from the relationship between the data processing processes of the first and second photographing operations illustrated in FIG. 5, the digital photographing apparatus according to the present embodiment is capable of storing the second data or data obtained by post-processing the second data in a storage medium (WR) while displaying a live view image for the second photographing operation on the display unit starting from the time t7 (LV'). In this case, the displaying of the live view image on the display unit (LV') and the storing of the second data or the data obtained by post-processing the second data (WR) are simultaneously performed until the time t8. Also, as apparent from the relationship between the data processing processes of the second and second photographing operations illustrated in FIG. 5, displaying of a live view for the third photographing operation (LV'') may be continued even after completing of storing second data or data obtained by post-processing the second data in the storage medium (WR'). In this case, until the storing of the second data or the data obtained by post-processing the second data in the storage medium (WR') is completed, the storing of the second data or the data obtained by post-processing the second data (WR') and displaying a live view image on the display unit (LV'') are simultaneously performed.

Figure 6:
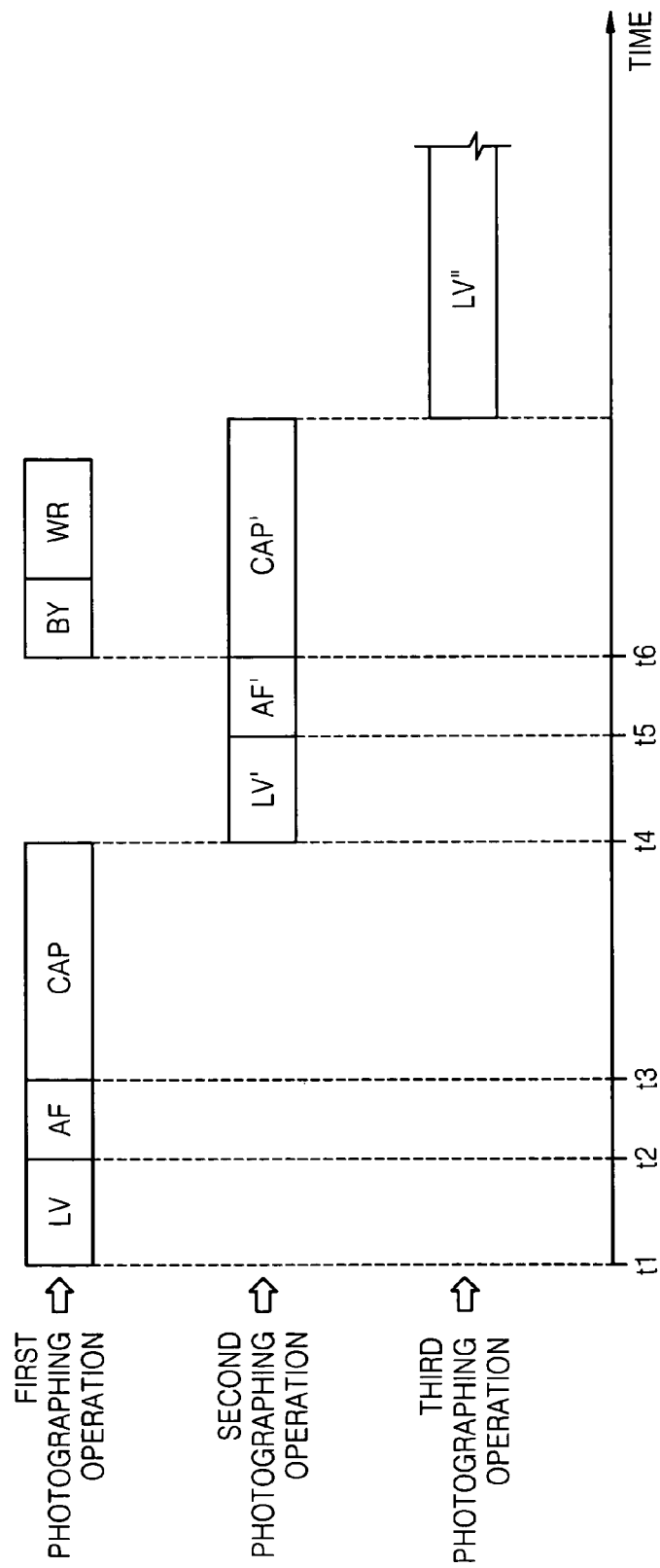
FIG. 6 is a timing diagram illustrating an example of a data processing process of a digital photographing apparatus according to a comparative example of the present invention.

FIG. 6 is a timing diagram illustrating an example of a data processing process of a digital photographing apparatus according to a comparative example of the present invention. Referring to FIG. 6, in order to perform a second photographing operation immediately after performing a first photographing operation, reading of first data (CAP) is completed at a time t4, and then a live view image for the second photographing operation is displayed on a display unit (LV') without converting the first data (BY'). This is because a data conversion unit is needed in order to display the live view image for the second photographing operation and thus cannot be used for converting data read during the first photographing operation.

Accordingly, the first data is read (CAP) and then the live view image for the second photographing operation is displayed on the display unit (LV') without converting the first data (BY'). At a time t6 when the displaying of the live view image for the second photographing operation is completed and thus reading of the first data starts for the second photographing operation in response to a signal received from a user, the data conversion unit starts to be used in order to convert the first data read according to the first photographing operation, conversion of the read first data (BY) is completed, and then the converted data is stored in a storage medium (WR). In this way, the interval between a time t3 when the first photographing operation starts and the time t4 when the displaying of the live view image on the display unit for the second photographing operation (LV') starts can be reduced.

However, in this case, as apparent from the relationship between the data processing processes of the second and third photographing operations illustrated in FIG. 6, data obtained according to a previous photographing operation is not stored in the storage medium when a subsequent photographing operation is not performed. That is, as illustrated in FIG. 6, when displaying a live view image for the third photographing operation display unit (LV''), if the live view image is kept displayed since no signal is received from the user, data obtained according to the second photographing operation is neither converted nor stored. Thus if a battery is separated from the digital photographing apparatus due to a physical impact, the operation of the digital photographing apparatus abnormally ends, the user ends the operation of the digital photographing apparatus while a live view image for the third photographing operation is still displayed on the display unit, or if the operation of the digital photographing apparatus ends due to battery discharging, the data obtained according to the second photographing operation is lost since it is not stored in the storage medium.

However, the digital photographing apparatus according to this embodiment is capable of not only immediately displaying a live view image for a subsequent photographing operation on the display unit in order to promptly perform the subsequent photographing operation, but also of storing data obtained according to a previous photographing operation in the storage medium simultaneously with the performing of the subsequent photographing operation, thereby preventing occurrence of the problem of the digital photographing apparatus illustrated in FIG. 6 according to the comparative example of the present invention. Although not shown in FIG. 5, the digital photographing apparatus according to the present embodiment may further include a resizing unit that generates data corresponding to a low-definition image of an image corresponding to second data and stores the generated data together with the second data in the storage medium, as will later be described with reference to FIGS. 9 and 10.

Figure 7:
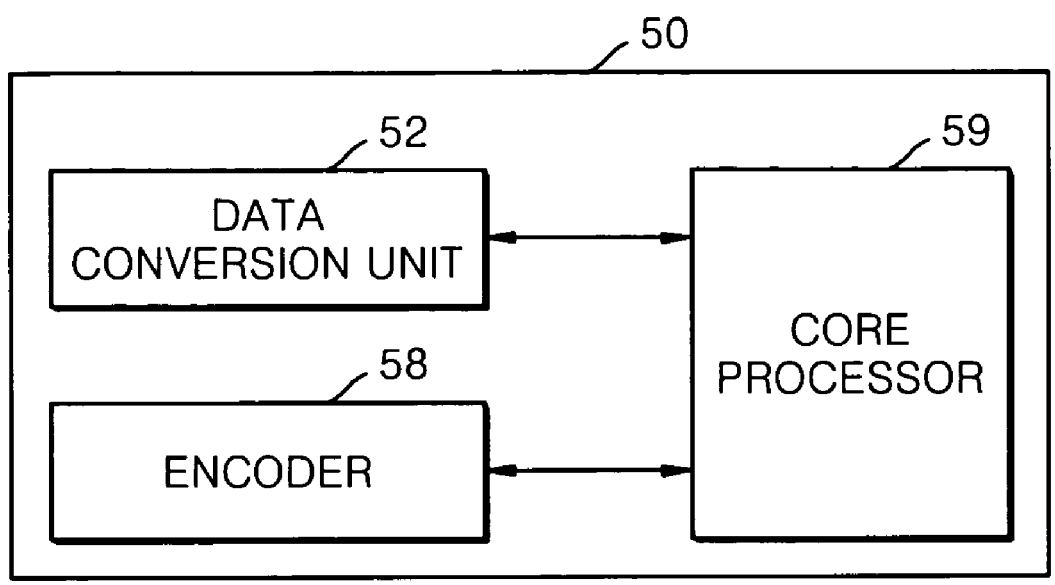
FIG. 7 is a block diagram schematically illustrating an example of a part of a digital photographing apparatus according to another embodiment of the present invention.
Figure 8:
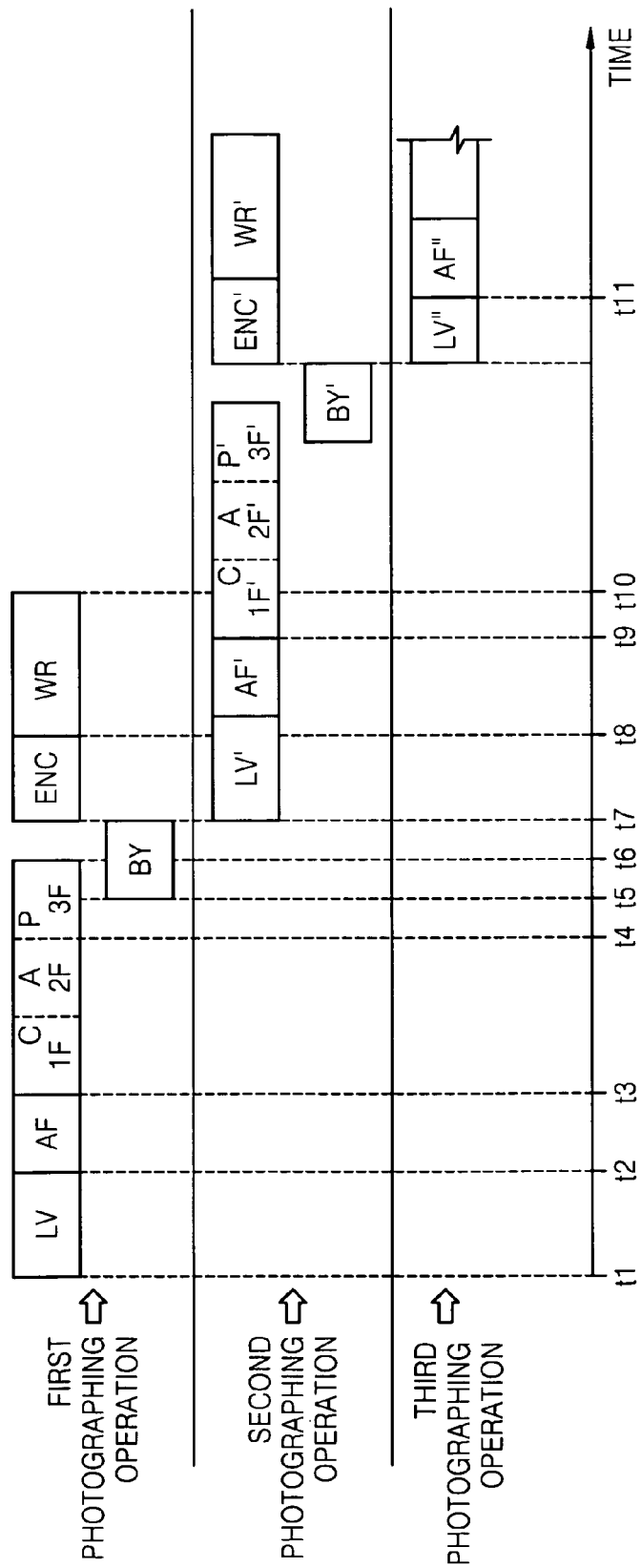
FIG. 8 is a timing diagram illustrating an example of a data processing process of the digital photographing apparatus illustrated in FIG. 7 according to an embodiment of the present invention.

FIG. 7 is a block diagram schematically illustrating an example of a part of a digital photographing apparatus according to another embodiment of the present invention. FIG. 8 is a timing diagram illustrating a data processing process of the digital photographing apparatus illustrated in FIG. 7. In particular, FIG. 8 is a timing diagram illustrating an example of an operation from displaying a live view image on a display unit in order to perform a first photographing operation to displaying another live view image on the display unit in order to perform a third photographing operation.

Referring to FIG. 7, a digital signal processor 50 of the digital photographing apparatus includes not only a data conversion unit 52 but also an encoder 58. As illustrated in FIG. 7, the digital signal processor 50 may further include a core processor 59 in order to control the operations of the data conversion unit 52 and the encoder 58. However, unlike as illustrated in FIG. 7, the encoder 58 may be constructed separately from the digital signal processor 50. The encoder 58 compresses second data received from the data conversion unit 52. For example, the encoder 58 may compress the second data, e.g., YCbCr data, into JPEG data.

In this case, as illustrated in FIG. 8, from a time t7, a live view image for a second photographing operation can be displayed on the display unit (LV') while the encoder 58 compresses second data obtained according to a first photographing operation (ENC). In this case, as apparent from the relationship between the data processing processes of the first and second photographing operations illustrated in FIG. 8, the digital photographing apparatus according to the present embodiment can simultaneously perform the compression of the second data by the encoder 58 (ENC) and the displaying of the live view image (LV') until the encoder 58 completes compression of the second data (ENC) at a time t8. However, as apparent from the relationship between the data processing processes of the second and third photographing operations illustrated in FIG. 8, compression of second data (ENC') and displaying of another live view image on the display unit (LV'') can be simultaneously performed until a time t11 when the displaying of the live view image (LV'') is completed.

As described above, if the second data is compressed using the encoder 58, the compressed second data can be stored in the storage medium. In this case, as the relationship between the data processing processes of the first and second photographing operations illustrated in FIG. 8, storing of the compressed data in the storage medium (WR) and displaying of the live view image for the second photographing operation on the display unit (LV') are simultaneously performed until a time t9 when the displaying of the live view image for the second photographing operation (LV') is completed. However, unlike as illustrated in FIG. 8, if the displaying of the live view image for the second photographing operation (LV') is continued even after a time t0 when the storing of the compressed data (WR) is completed, the storing of the compressed data (WR) and the displaying of the live view image (LV') are simultaneously performed until the storing of the compressed data (WR) is completed.

Figure 9:
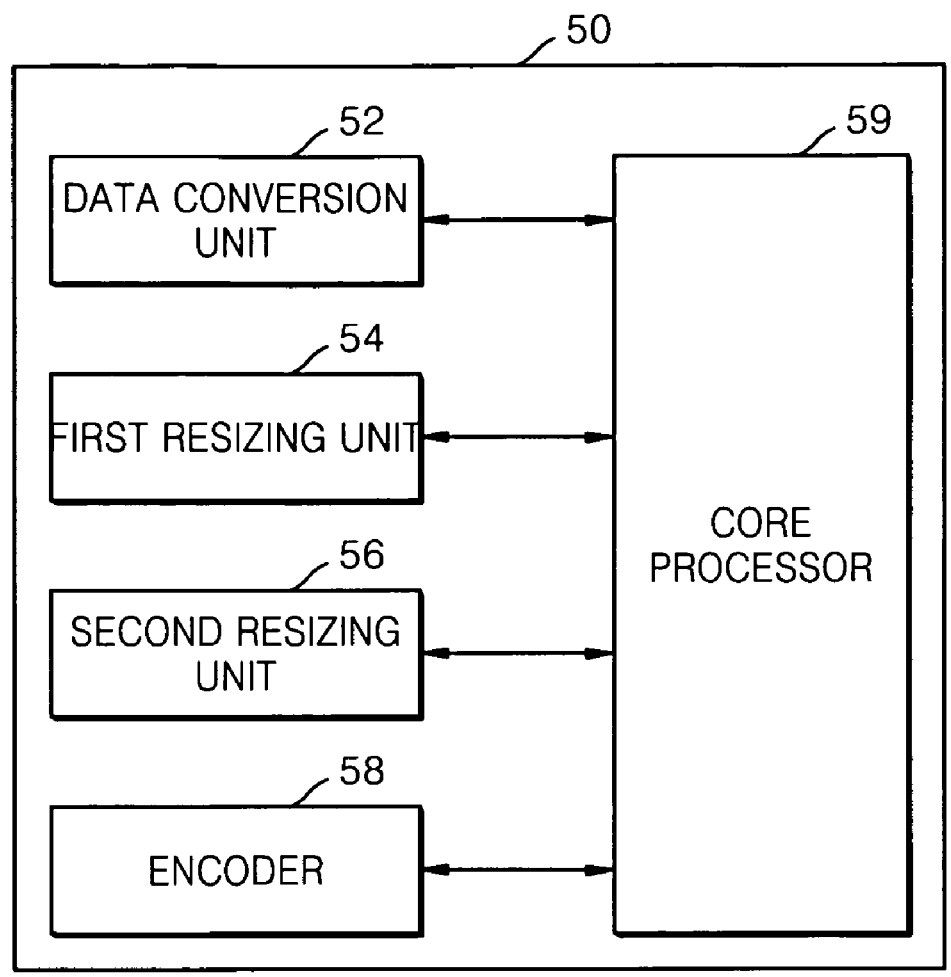
FIG. 9 is a block diagram schematically illustrating an example of a part of a digital photographing apparatus according to another embodiment of the present invention.
Figure 10:
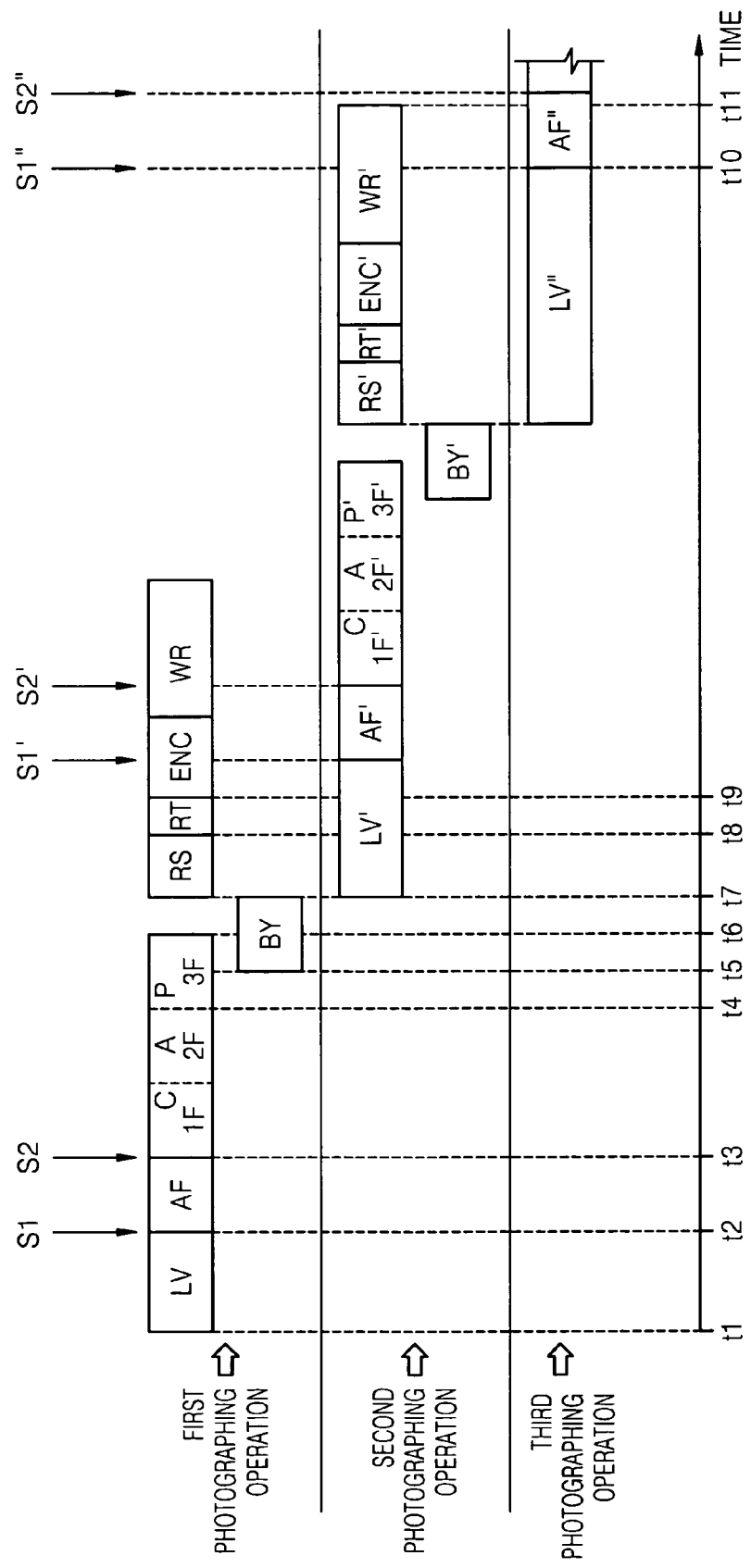
FIG. 10 is a timing diagram illustrating an example of a data processing process of the digital photographing apparatus illustrated in FIG. 9 according to another embodiment of the present invention.

FIG. 9 is a block diagram schematically illustrating an example of a part of a digital photographing apparatus according to another embodiment of the present invention. FIG. 10 is a timing diagram illustrating a data processing process of the digital photographing apparatus of FIG. 9 according to another embodiment of the present invention. In detail, FIG. 10 is a timing diagram illustrating an operation from displaying a live view image on a display unit for a first photographing operation to displaying another live view image on the display unit for a third photographing operation.

Referring to FIG. 9, a digital signal processor 50 of the digital photographing apparatus according to the present embodiment includes not only a data conversion unit 52 and an encoder 58 but also a resizing unit. Although FIG. 9 includes that the digital signal processor 50 includes a first resizing unit 54 and a second resizing unit 56, the present invention is not limited thereto. Also, unlike as illustrated in FIG. 9, the data conversion unit 52, the encoder 58, and the first and second resizing units 54 and 56 may be constructed separately from the digital signal processor 50. The first and second resizing units 54 and 56 generate data corresponding to a low-definition image of an image corresponding to second data from the second data.

The data processing process of the example of a digital photographing apparatus illustrated in FIG. 10 is different from that of the digital photographing apparatus illustrated in FIG. 8 in that it further includes performing resizing by the first and second resizing units 54 and 56. In this case, as illustrated in FIG. 10, after data conversion of the data conversion unit 52, displaying of a live view image, which is generated from light incident on an image capture device, on the display unit for a second photographing operation (LV') starts simultaneously with generation of third data using the first resizing unit 54 (RS), starting from a time t7. Also, the displaying of the live view image (LV') and the generation of the third data (RS) are simultaneously performed until a time 8 when the first resizing unit 54 completes generation of the third data (RS). However, as illustrated in FIG. 10, the displaying of the live view image (LV') and the generation of fourth data using the second resizing unit 56 (RT) may be simultaneously performed until a time t9 when the second resizing unit 56 completes the generation of the fourth data (RT).

In general, the size of the second data, such as YCbCr data, or data compressed by encoder 58 is very large but the size of the display unit included in the digital photographing apparatus is less than the size of the second data or the compressed data. Thus, it takes a long time and a central processing unit (CPU) of the digital photographing apparatus is overloaded when an image is displayed on the display unit of the digital photographing apparatus by using the second data, such as YCbCr data, or the compressed data. Accordingly, data regarding a low-definition image is preferably used when using an image on the display unit of the digital photographing apparatus. The first resizing unit 54 generates data regarding a low-definition image, what is called a screen nail image, which is used when displaying an image on the display unit of the digital photographing apparatus.

Also, a plurality of images can be simultaneously displayed on the display unit of the digital photographing apparatus, and data regarding further lower definition images are preferably used in this case. The second resizing unit 56 generates data regarding such a further lower definition mage, which is called a thumbnail image. Although the digital photographing apparatus according to the present embodiment includes both the first resizing unit 54 and the second resizing unit 56, any one of the first and second resizing units 54 and 56 can be omitted if needed.

The generated third or fourth data can also be stored when storing the second data, such as YCbCr data, in a storage medium. Also, when post-processing, such as compression of the second data, is performed using the encoder 58, data obtained by post-processing the second data, and the third data are stored.

As apparent from the data processing processes of the second and third photographing operations illustrated in FIG. 10, the digital photographing apparatus according to this embodiment can simultaneously perform storing either the second data or the data obtained by post-processing the second data, and data generated by the first and second resizing units 54 and 56 (WR'), and displaying a live view image on the display unit (LV") until a time t10 when the displaying of the live view image (LV") is completed. However, unlike as illustrated in FIG. 10, if the displaying of the live view image (LV") is continued until a time 11 when the storing of either the second data or the data obtained by post-processing the second data, and the data generated by the first and second resizing units 54 and 56 (WR') ends, the storing of either the second data or the data obtained by post-processing the second data, and the data generated by the first and second resizing units 54 and 56 (WR') and the displaying of the live view image (LV") can be simultaneously performed until the storing of either the second data or the data obtained by post-processing the second data, and the data generated by the first and second resizing units 54 and 56 (WR') is completed. In this case, the data obtained by post-processing the second data means the result of compressing the second data using the encoder 58. The encoder 58 is as described above with reference to FIGS. 7 and 8.

Although FIG. 10 illustrates that the compression of the second data using the encoder 58 (ENC) is accompanied by the generation of the third data using the first resizing unit 54 (RS) and the generation of the fourth data using the second resizing unit 56 (RT), the digital photographing apparatus according to the present embodiment is limited thereto. That is, the generation of the third data (RS) and the generation of the fourth data (RT) may be performed with the compression of the second data using the encoder 58 (ENC).

As described above, in the case of a digital photographing apparatus according to the embodiments of the present invention described herein, a data conversion unit starts conversion of read data into second data while a first data reading unit reads a last group of data, thereby remarkably reducing the interval between first and second photographing operations during continuous shooting. Also, data obtained according to the first photographing operation is processed and stored in a storage medium during the process for the second photographing operation. Thus even if the operation of the digital photographing apparatus unexpectedly ends, data obtained according to a previous photographing operation can be securely retained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus comprising:
an image capture device for generating first data regarding an image generated from light input in response to a signal input by a user;
a first data reading unit for reading the first data in units of plurality of N interlaced groups into read data, where N=2, a first of the interlaced groups comprising rows {0, N, 2N, . . . } of the first data, a second of the interlaced groups comprising rows {1, N+1, 2N+1, . . . } of the first data, and a last of the interlaced groups comprising rows {N−1, 2N−1, 3N−1, . . . } of the first data the reading of the first data into the read data ending with completion of the reading of the last interlaced group of the first data;
a data conversion unit for converting the read data into second data; and a display unit for displaying the image generated from the light incident on the image capture device,
wherein the data conversion unit starts conversion of the read data into the second data after the first data reading unit starts reading of the last interlaced group of the first data and before the first data reading unit completes the reading of the first data into the read data.

2. The apparatus of claim 1, wherein the conversion of the read data by the data conversion unit and the reading of the first data by the first data reading unit are simultaneously performed before the reading of the last interlaced group of the first data ends.

3. The apparatus of claim 2, wherein displaying of a live view image generated from the light incident on the image capture device starts after the conversion of the read data into the second data.

4. The apparatus of claim 3, further comprising a storage medium that is attachable to or detachable from the apparatus, or is fixedly built in the apparatus, wherein the second data or data obtained by post-processing the second data is stored in the storage medium while displaying the live view image on the display unit.

5. The apparatus of claim 4, wherein the storing of the second data or the data obtained by post-processing the second data and the displaying of the live view image are simultaneously performed until the storing of the second data or the data obtained by post-processing the second data in the storage medium ends.

6. The apparatus of claim 4, wherein the storing of the second data or the data obtained by post-processing the second data and the displaying of the live view image are simultaneously performed until the displaying of the live view image ends.

7. The apparatus of claim 3, further comprising an encoder for compressing the second data received from the data conversion unit, wherein the encoder compresses the second data while the live view image is displayed on the display unit.

8. The apparatus of claim 7, wherein the compression of the second data using the encoder and the displaying of the live view image are simultaneously performed until the encoder completes the compression of the second data.

9. The apparatus of claim 7, wherein the compression of the second data and the displaying of the live view image are simultaneously performed until the displaying of the live view image ends.

10. The apparatus of claim 7, further comprising a storage medium that is attachable to or detachable from the apparatus, or is fixedly built in the apparatus, wherein the result of compressing the second data using the encoder is stored in the storage medium while displaying the live view image on the display unit.

11. The apparatus of claim 10, wherein the storing of a result of compressing the second data and the displaying of the live view image are simultaneously performed until the storing of the result of compressing the second data is completed.

12. The apparatus of claim 10, wherein the storing of the result of compressing the second data and the displaying of the live view image are simultaneously performed until the displaying of the live view image ends.

13. The apparatus of claim 2, further comprising a resizing unit for generating third data corresponding to a low-definition representation of the image from the second data, wherein the resizing unit generates the third data from the second data after the data conversion of the data conversion unit.

14. The apparatus of claim 13, wherein displaying of a live view image generated from the light incident on the image capture device on the display unit starts after the data conversion of the data conversion unit, where the displaying of the live view image and the generation of the third data using the resizing unit start simultaneously.

15. The apparatus of claim 14, wherein the displaying of the live view image and the generation of the third data are simultaneously performed until the generation of the third data ends.

16. The apparatus of claim 15, further comprising a storage medium that is attachable to or detachable from the apparatus, or is fixedly built in the apparatus,
wherein the third data, and either the second data or the data obtained by post-processing the second data are stored in the storage medium while displaying the live view image on the display unit after the generation of the third data.

17. The apparatus of claim 16, wherein the storing of the third data, and either the second data or the data obtained by post-processing the second data, and the displaying of the live view image are simultaneously performed until the storing of the third data, and either the second data or the data obtained by post-processing the second data ends.

18. The apparatus of claim 16, wherein the storing of the third data, and either the second data or the data obtained by post-processing the second data, and the displaying of the live view image are simultaneously performed until the displaying of the live view image ends.

19. The apparatus of claim 15, further comprising an encoder for compressing the second data received from the data conversion unit, wherein the encoder compresses the second data while the live view image is displayed on the display unit.

20. The apparatus of claim 19, wherein the compression of the second data and the displaying of the live view image are simultaneously performed until the encoder completes the compression of the second data.

21. The apparatus of claim 19, wherein the compression of the second data and the displaying of the live view image are simultaneously performed until the displaying of the live view image ends.

22. The apparatus of claim 19, further comprising a storage medium that is attachable to or detachable from the apparatus, or is fixedly built in the apparatus, wherein the third data and the result of compressing the second data are stored in the storage medium while displaying the live view image on the display unit.

23. The apparatus of claim 14, wherein the displaying of the live view image and the generation of the third data are simultaneously performed until the displaying of the live view image ends.

24. A digital photographing apparatus comprising:
an image capture device for generating first data regarding an image generated from light input in response to a signal input by a user;
a first data reading unit for reading the first data in units of a plurality of interlaced groups into read data, the reading of the first data into the read data ending with completion of the reading of a last interlaced group of the first data;
a data conversion unit for converting the read data into second data; and
a display unit for displaying the image generated from the light incident on the image capture device,
wherein the data conversion unit starts conversion of the read data into the second data after the first data reading unit starts reading of the last interlaced group of the first data and before the first data reading unit completes the reading of the first data into the read data,
wherein the read data comprises for each pixel red data R, green data G and blue data B,
wherein the second data comprises for each pixel red data R', green data G' and blue data B', and
wherein the converting the read data into the second data for each pixel comprises the following expressions:

$Y = 0.29900R' + 0.58700G' + 0.11400B$ $Cb = -0.16874R' - 0.33126G' + 0.50000B$ $Cr = 0.50000R' - 0.41869G' - 0.08131B$ $R' = 1.00000Y + 1.40200Cr$ $G' = 1.00000Y - 0.34414Cb - 0.71414Cr$ $B' = 1.00000Y + 1.77200Cb.$

* * * * *